United States Patent [19]

Ongetta

[11] Patent Number: 4,977,874
[45] Date of Patent: Dec. 18, 1990

[54] COMBUSTION CHAMBER

[75] Inventor: Renato Ongetta, Desenzano Del Garda, Italy

[73] Assignee: Borgo-Nova SpA, Alpignano, Italy

[21] Appl. No.: 419,085

[22] Filed: Oct. 10, 1989

[30] Foreign Application Priority Data

Oct. 27, 1988 [IT] Italy ................ 67968 A/88

[51] Int. Cl.⁵ .................................... F02B 19/06
[52] U.S. Cl. .................... 123/269; 123/279; 123/263
[58] Field of Search ........... 123/279, 276, 269, 263, 123/275, 262, 307

[56] References Cited

U.S. PATENT DOCUMENTS

| | | | |
|---|---|---|---|
| 2,113,711 | 4/1938 | Ricardo | 123/275 |
| 2,766,738 | 10/1956 | Hoffman | 123/269 |
| 3,196,857 | 7/1965 | Zimmerman | 123/269 |
| 3,220,389 | 11/1965 | Rinsum et al. | 123/269 |
| 3,924,580 | 12/1975 | Taira et al. | 123/307 |
| 4,063,537 | 12/1977 | Lampredi | 123/262 |
| 4,166,436 | 9/1979 | Yamakawa | 123/263 |
| 4,195,597 | 4/1980 | Hofbauer et al. | 123/269 |
| 4,237,827 | 12/1980 | Hamai | 123/269 |
| 4,300,498 | 11/1981 | Wray | 123/263 |
| 4,303,045 | 12/1981 | Austin | 123/266 |
| 4,635,597 | 1/1987 | Obushi et al. | 123/276 |
| 4,719,884 | 1/1988 | Shinno | 123/369 |
| 4,785,776 | 11/1988 | Cokura et al. | 123/269 |
| 4,881,501 | 11/1989 | Shinzawa et al. | 123/279 |

FOREIGN PATENT DOCUMENTS

| | | | |
|---|---|---|---|
| 1,344,892 | 10/1963 | France | 123/269 |
| 1,489,802 | 10/1977 | United Kingdom | |

Primary Examiner—Raymond A. Neill
Attorney, Agent, or Firm—William R. Hinds

[57] ABSTRACT

A combustion chamber formed in the crown of a piston for an indirect injection diesel engine is described the combustion chamber having an elongate entry channel adjacent the gas efflux of a precombustion chamber, the channel leading into four branches which generate vortices in the burning charge and which vortices are coherent and mutually self-reinforcing.

8 Claims, 2 Drawing Sheets

COMBUSTION CHAMBER

The present invention relates to a combustion chamber formed in the crown of a piston for indirect injection (IDI) diesel engines.

In IDI diesel engines combustion of the charge occurs partly in a precombustion chamber, which is frequently situated in the cylinder head, and partly in a combustion chamber formed between the piston crown and the cylinder head surface. The shape of the latter chamber is generally formed mainly in the piston crown. The objective of the piston combustion chamber is to generate high turbulence to effect complete combustion of the fuel charge.

Turbulence is generated by the shaped piston crown by redirection of the burning charge which is issuing from the orifice of the precombustion chamber. The turbulence may be in the form of vortices which are intended to expand and fill the whole combustion chamber formed in the cylinder during the power stroke of the engine. Typical piston combustion chambers which have been used in the past are shown in U.S. Pat. No. 2,113,711 of Ricardo, U.S. Pat. No. 3,924,580 of Taira et al and U.S. Pat. No. 4,063,537 of Lampredi. Such combustion chambers have not been completely effecti-ve in burning the entire fuel charge as is evidenced by deposits formed on the piston crown in areas which have either low turulence or lower emperatures or both. The consequence of inefficient combustin is increased emissions from the engine and a decay in thermal efficiency.

According to the present invention a combustion chamber formed in the crown of a piston for an indirect injection diesel engine comprises an entry channel adjacent the gas efflux of a precombustion chamber, the channel leading into four curved branches which generate vortices in the burning charge and which vortices are coherent and mutually self-reinforcing.

It is believed that the four vortices which are generated by the combustion chamber of the present invention serve to more efficiently sweep up small droplets of fresh charge which are prematurely enjected from the precombustion chamber prior to being ignited. The increased turbulence generated by the combustion chamber of the present invention caused these droplets to be brought back into a zone more suitable for combustion, such as adjacent the efflux from the precombustion chamber.

These small droplets in prior art combustion chambers have not been able to assume the swirl movement generated by the combustion chamber and have therefore failed to become completely atomised. The combustion chamber according to the present invention is able to sweep up such ejected fuel droplets in the much stronger and self reinforcing vortices which are formed.

It has been found with the combustion chamber of the present invention that fuel consumption, smoke emission and power output are allsignificantly improved at higher engine speeds.

In order that the present invention may be more fully understood, an example will now be described by way of illustration only with reference to the accompanying drawings, of which:

Figures 1, 2:
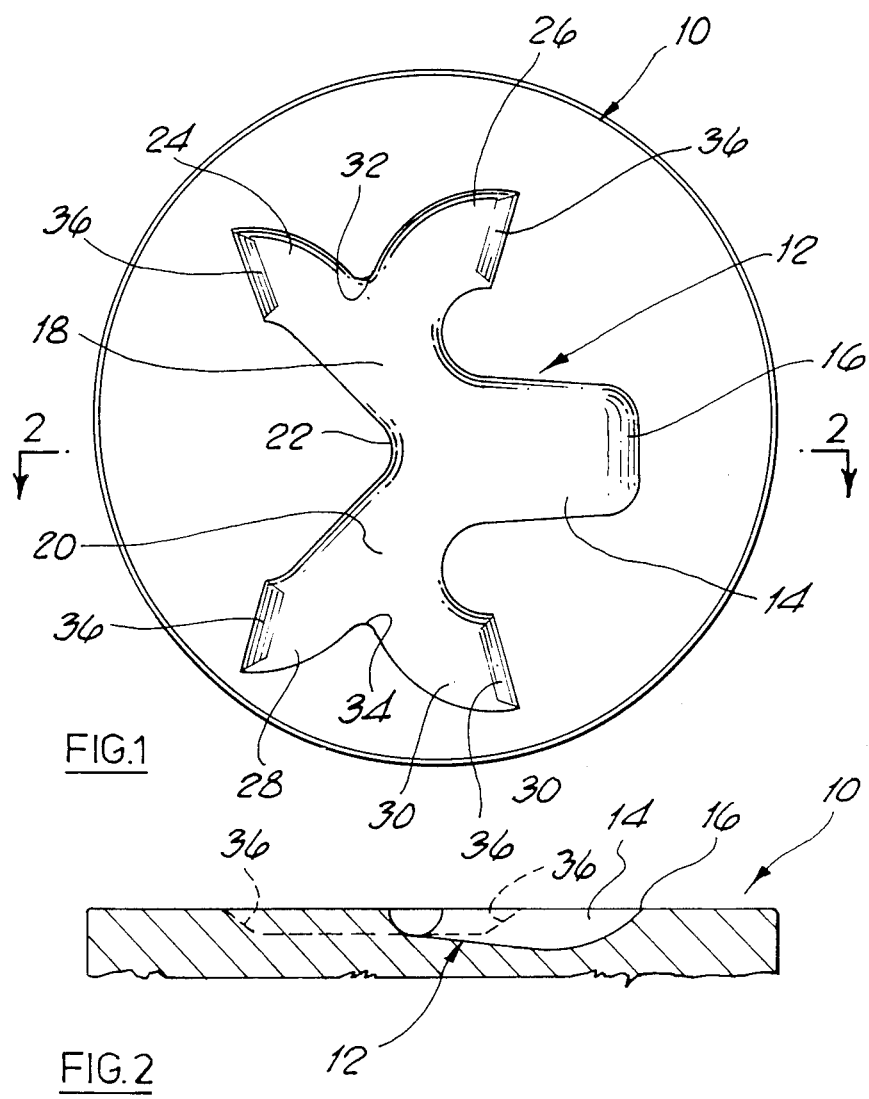
FIG. 1 shows a plan form of a combustion chamber according to the present invention.
FIG. 2 shows a section through the line 2—2 of FIG. 1.

Referring now to FIGS. 1 and 2 and where the crown of a piston is designated generally at 10. A combustion chamber 12 is formed in the top surface of the piston either by casting or machining. The combustion chamber 12 comprises an elongate entry channel 14 having a closed end 16 adjacent the gas efflux (not shown) of a precombustion chamber (not shown) in the cylinder head (not shown). The entry channel is split into two branches 18 and 20 leaving a projecting nose piece 22 opposite the channel 14, the two branches 18 and 20 are themselves split into two branches 24,26 and 28,30 respectively. Each branch 24,26,28 and 30 has a ramp 36 at the end to divert gasses in an upwardly direction towards the cylinder head (not shown).

The branches 24,26,28 and 30 are of generally arcuate form, for example, circular and are mutually connected. Depending upon the specific engine design these branches may be of the same or different circumferential extent and may be of the same or differing curvatures. Similarly, the width and side profile of each branch may differ in order to optimise combustion with regard to the particular characteristics of the engine in question.

Figure 3:
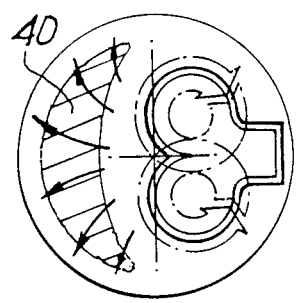
FIGS. 3, 4 and 5 show plan forms of prior art combustion chambers having super-imposed thereon a schematic representation of the gas flow in such combustion chambers and FIG. 6 which shows the gas flow in the combustion chamber of FIG. 1.
Figure 4:
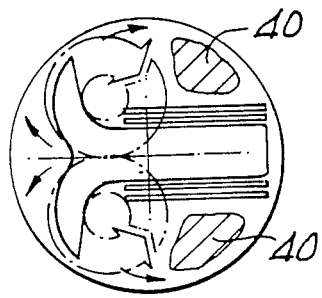
Figure 5:
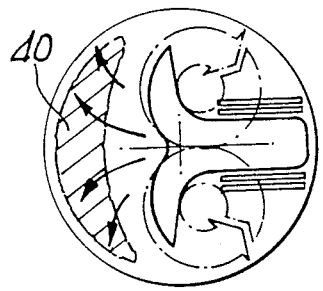

The prior art combustion chambers shown in FIGS. 3,4 and 5 generate swirl of the burning fuel charge in the direction shown by the broad arrows. The vortices, however, tend to be localised in the combustion chamber as the piston descends and fail to completely atomise small fuel droplets (indicated by the narrow curved arrows) which are prematurely ejected from the precombustion chamber. Under such conditions it is inevitable that a certain percentage of fuel, prematurely ejected from the precombustion chamber and excluded from the area of the vortices indicated by the broad arrows, fails to burn completely. Inefficient fuel combustion is evidenced by the presence of carbonaceous deposits in the shaded areas 40.

Figure 6:
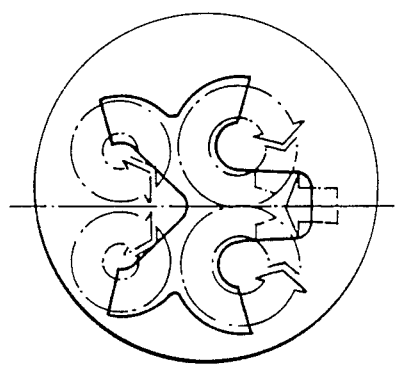

As indicated in FIG. 6, the combustion chamber of the present invention generates high turbulence by vortices which expand to fill the whole area of the piston crown as the piston descends on the powder stroke. Because of the directions of circular motion which the gasses are forced to adopt by the branches 24,26,28 and 30 and the nose pieces 22,32 and 34 the vortices are self-reinforcing or self-exciting because at the regions where they touch the gas flows have the same direction.

Pistons having the form of combustion chamber described have been run in engines for extended periods and shown no localised carbonaceous deposits. The pistons were fitted to a 1724cc, four cylinder diesel engine which was originally fitted with pistons having a crown combustion chamber similar to that shown in FIG. 4. Comparative testing has shown a reduction of 26% in smoke emission at 4000rev/min, an increase in power of 3.5% at 4300rev/min and a reduction of 3.5% in fuel consumption at 4400 rev/min. The performance of the combustion chamber of the present invention was significantly better in all respects at engine speeds above 3700 rev/min whilst below this engine speed the performances were virtually the same.

I claim:

1. A combustion chamber formed in the crown of a piston for an indirect injection diesel engine, said chamber comprising an entry channel adjacent the gas efflux of a precombustion chamber, the channel leading into four curved branches which generate vortices in the burning charge and which vortices are coherent and mutually self-reinforcing.

2. A combustion chamber according to claim 1 wherein there are two branches each side of a line which bisects the entry channel.

3. A combustion chamber according to claim 1 wherein each branch terminates with a curved portion.

4. A combustion chamber according to claim 1 wherein each branch is finished with an inclined ramp.

5. A combustion chamber according to claim 1 wherein on each side of a line which bisects the entry channel there is a single branch joined to the end of the entry channel remote from the precombustion chamber gas efflux and which single branch divides into two curved branches.

6. A combustion chamber according to claim 2 wherein each pair of curved branches lying either side of a line which bisects the entry channel are themselves separated by nose pieces to aid directing of gas flow during combustion.

7. A combustion chamber according to claim 5 wherein the single branches are themselves separated by a nose piece to aid directing of gas flow during combustion.

8. A combustion chamber according to claim 6 wherein the single branches are themselves separated by a nose piece to aid directing of gas flow during combustion.

* * * * *